Figure 1:
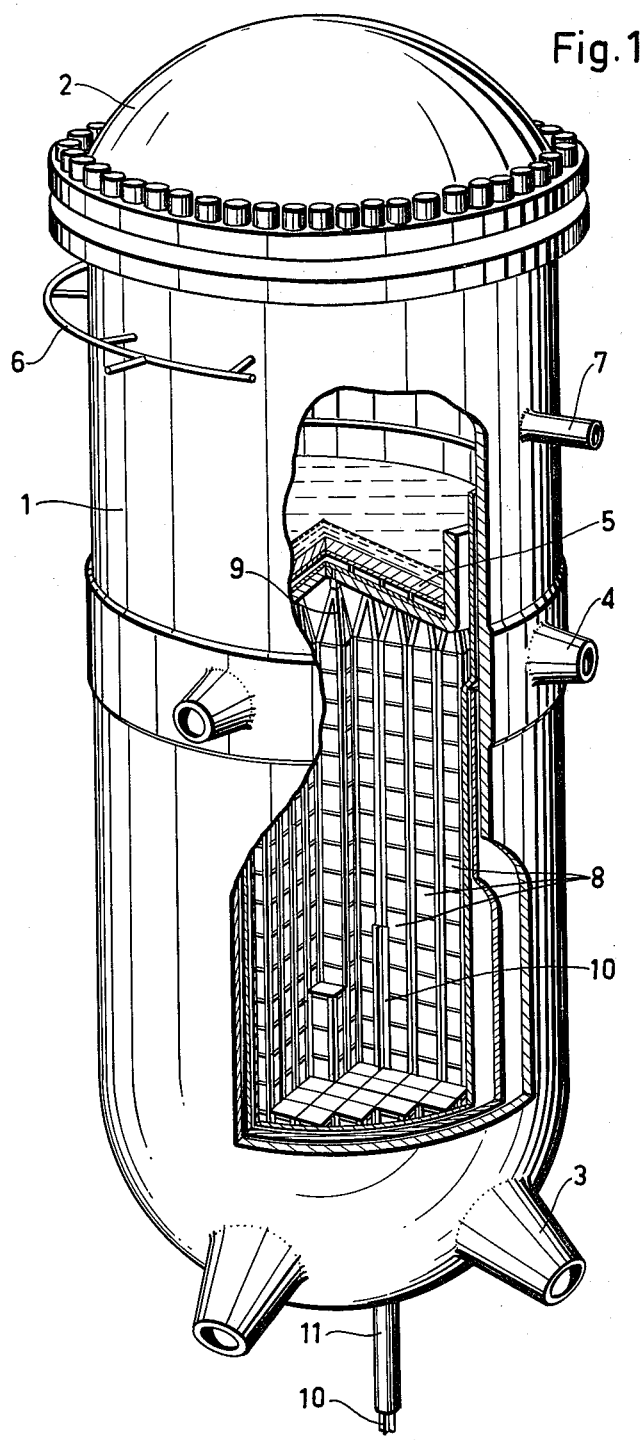

Jan. 4, 1966   B. T. A. HARGÖ ETAL   3,227,621
HETEROGENEOUS ATOMIC REACTOR
Filed May 1, 1961   2 Sheets-Sheet 1

3,227,621
HETEROGENEOUS ATOMIC REACTOR
Bernt Torsten Allan Hargö, Solna, and Dick Gilbert Dahlgren, Gustavsberg, Sweden, assignors to Aktiebolaget Atomenergi, Stockholm, Sweden, a company of Sweden
Filed May 1, 1961, Ser. No. 106,659
Claims priority, application Sweden, May 11, 1960, 4,676/60
1 Claim. (Cl. 176—50)

The present invention refers to a heterogeneous atomic reactor of the type that is operated by a natural or a slightly enriched fissionable material and that has heavy water as a coolant and moderator. According to the invention the reactor is intended to operate at a water temperature higher than 100° C., and preferably at a water temperature above 200° C., viz. when the reactor is to be used for the generation of electric power.

When using reactors cooled by heavy water it is usual to arrange the fissionable material as rods, and to group a number of rods together in a cluster, and to enclose each cluster of rods in a conduit through which the cooling water is allowed to run. The moderator is located between the conduits, and the moderator can be pressurised or non-pressurised. If it is not pressurised the conduits must bear the whole of the operating pressure. One drawback with reactors of this type is that the cooling channels of the fuel elements are severely strained from the thermal and hydraulic point of view, particularly in high power reactors. The cooling water in the conduits must in such cases flow at several metres per second. Because the amount of cooling water in the fuel element channels is so small, a stoppage in the circulation pumps will as a rule result in injurious over-heating of the fuel. The forces of natural circulation are unable to support an adequate circulation for cooling purposes.

In this type of atomic reactors both the moderator and the coolant can consist of heavy water. The coolant and the moderator can be connected in series, for example, so that the heavy water is first allowed to run through the conduits as a coolant and thereafter through the moderator chamber. By means of such an arrangement one can obtain the favourable effect that will in the following specification be called "self-regulation," which means that an increase in the temperature of the coolant leads to an increase in the temperature of the moderator water, through which the moderating capacity of the moderator is lowered and the reactor effect is automatically reduced. One drawback, however, is that the self-regulation only occurs after a certain delay, caused by the fact that the water must first run through the long conduits and thereafter back through the moderator chamber. In addition the large volume of the moderator will not be available for use for heat accumulation in critical situations.

The first object of the present invention is to provide a reactor in which the self-regulation described above becomes effective immediately if overheating occurs. Another object of the invention is to provide a reactor having as low a flow resistance as possible to the water that flows through it. Other objects of the invention will be set out below.

According to the invention the atomic reactor is characterised in that the fuel is arranged in the form of rods, having for example a circular cross-section and a diameter preferably less than 20 mm., said rods being arranged parallel to or at an angle to the main direction of the flow of water through the reactor, preferably evenly distributed and in direct contact with the water serving both as a coolant and a moderator, and so spaced apart from each other that the volume of water in the core of the reactor is, preferably, more than 5 times that of the fuel.

According to the invention then, the fuel, which can be a metallic or oxide fissionable substance is in the form of rods. The rods are enclosed in a suitable material, such as a zirconium alloy, as already known. The rods can have circular cross-sections but can also have any desired cross-sections, for example a rectangular section, with one side considerably longer than the other. In this case the rods will rather have the form of strips or elongated plates. The thickness of the rods will, as already known, determine the possibility of leading away the heat that develops in the rods. In the atomic reactor according to the invention, which is intended for high power, the rods should preferably be kept thin. Thus in the case of cylindrical rods the diameter should be less than 20 mm., preferably below 15 mm., but thicknesses of as little as 5 to 7 mm., are possible. The rods should preferably extend throughout the whole of the reactor core, either lengthwise or across. Two or more rods could be joined to form one long rod. The rods should be fastened at both ends. It is preferable, moreover, if slender rods are supported at one or more points along the length of the rods.

It is preferable if the fuel rods are evenly spaced in the core of the reactor. An even distribution of the fuel rods is i.a. accompanied by an elimination of the variation of the neutronic flow which occurs when the rods are arranged in groups. Thus the even distribution produces a more advantageous long term variation and a higher average effect from the fuel, as well as more even burning.

In the reactor according to the invention the fuel rods are in direct contact with the whole of the water in the core of the reactor, which is, in a manner already known, enclosed in a vessel which takes the operating pressure. Consequently the body of water serves as both a coolant and a moderator simultaneously. This implies that an increase of temperature in the fuel leads more or less instantly to an increase of temperature in the moderator, and consequently the power of the reactor is reduced immediately. Thus the greatest possible use is made of the above-named self-regulation.

In the reactor according to the invention the fuel rods shall lie at such a distance from each other that the volume of water in the core of the reactor will be much greater than the volume of the fuel. The ratio of water to fuel should preferably exceed 5:1. A suitable ratio with oxidic fuel is from 15:1 to 20:1 and with a metallic fuel from 25:1 to 35:1.

Because of the relatively large distances between the fuel rods the resistance to the flow of the water will be low. The speed of flow can be kept considerably lower than in the conduits of a conduit equipped reactor, thanks to the fact that all the water in the reactor acts as a coolant. Since the fuel rods are in good contact with a large volume of water the risk of "dry-cooking" through overheating is very small. The fuel rods can be manufactured and mounted with a lower degree of precision than is the case with the tightly fitting fuel rods in the type of reactor referred to above.

Figure 2:
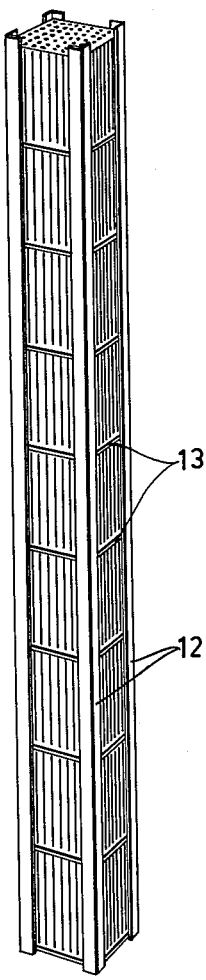
Figure 3:
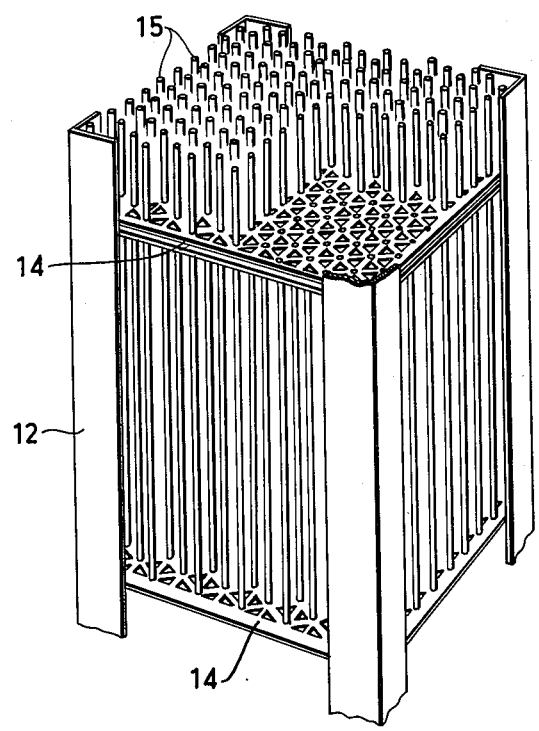

The invention will be more closely described with reference to the accompanying drawings, where FIG. 1 illustrates an embodiment of the reactor of the invention, a portion of the reactor wall and some fuel columns having been broken away, FIG. 2 illustrates a fuel column, and FIG. 3 illustrates, on a larger scale, the top portion of the fuel column of FIG. 2.

The reactor of FIG. 1 comprises a pressure vessel 1 having a lid 2, inlet pipes 3 for cooling water, and outlet pipes 4 for the water having been heated in the reactor. The reactor vessel contains a horizontal partition wall 5, defining a lower space in which the fissionable fuel is provided, and an upper space containing neither fuel nor water. Steam can be withdrawn from said upper space by a pipe 7, and water can be sprayed into said space by a system of pipes 6.

In said lower space of the reactor there are arranged a plurality of fuel columns 8, having a square cross-section. The columns rest on suitable supports, not shown, and their top ends are secured to the partition wall 5 by pyramid-shaped holders 9. The columns are arranged in a square pattern, and they are situated close to each other so as to support each other to form a rigid reactor core. On some places there is a narrow space between four adjacent columns, so as to permit the insertion of a control rod 10 made of a neutron-absorbing material. The control rods extend, via pipes 11, below the bottom of the reactor vessel, and they can be lifted and lowered in a manner known per se.

The columns are made of a frame that consists of lengthwise girders 12 and transverse stays 13. At suitable intervals in the framework there are holders 14 arranged for the fuel rods 15. These holders are perforated so that they do not noticeably impede the flow of water. In FIG. 3 the ends of a number of fuel rods have been broken away, so as to better disclose the openings and perforations in the plate-shaped holders 14. The distance between any two of the holders depends on the stiffness of the fuel rods 15. The fuel rods which have circular cross-sections in the example shown, are thus held tight at the ends and are supported at one or more points along their length. In the illustrated embodiment, the fuel rods are so arranged that three adjacent rods are at the corners of an equilateral triangle.

It will be understood that the fuel rods 15, when the columns 8 are situated close to each other, will be distributed entirely uniformly and evenly over the cross-sectional area of the reactor core. There is no clustering together of a number of fuel rods.

The columns in the illustrated embodiment are thus placed vertically in the core of the reactor, and the water flows upward parallel with the fuel rods. Because the columns have open sides a sideways flow of water can take place. When the fuel is to be exchanged one single column can, if desired, be taken out of the core, after the partition wall 5 has been lifted up, and a new column can be lowered in its place.

What is claimed is:

A heterogeneous nuclear reactor of the pressurized water type comprising a pressure vessel, means for the introduction of heavy water into the lower end of said vessel, an outlet for heated heavy water adjacent to the upper end of said vessel, fuel in the form of spaced, parallel, cylindrical rods of fissionable material evenly distributed over the entire cross-section of said vessel and extending in the direction of flow of heavy water through said vessel, said rods each having a diameter less than 20 mm. and being so spaced from each other that the ratio of the volume of heavy water to the volume of fuel in said vessel is more than 5 to 1, said rods being mounted in columns of square cross-section so arranged with respect to each other that the distance between rods in adjacent columns is substantially equal to the distance between rods in the same column, the spaces between said rods being substantially free of partitions whereby the heavy water filling said spaces serves both as coolant and moderator and is free to move in all directions, said reactor being designed to be operated at a water temperature higher than 100° C.

References Cited by the Examiner
UNITED STATES PATENTS

| | | | |
|---|---|---|---|
| 2,810,689 | 10/1957 | Wigner et al. | 204—154.32 |
| 2,898,280 | 8/1959 | Schultz | 204—154.2 |
| 2,985,575 | 5/1961 | Dennis et al. | 204—193.2 |
| 3,034,975 | 5/1962 | Beurtheret | 204—193.2 |
| 3,105,026 | 9/1963 | Dickson | 204—193.2 |

FOREIGN PATENTS 810,718  3/1959  Great Britain.

LEON D. ROSDOL, *Primary Examiner.*

REUBEN EPSTEIN, CARL D. QUARFORTH,
*Examiners.*

W. T. HOUGH, L. DEWAYNE RUTLEDGE,
*Assistant Examiners.*